United States Patent
Dao et al.

(10) Patent No.: US 10,606,661 B2
(45) Date of Patent: Mar. 31, 2020

(54) ON-DEMAND PROVISIONING OF CUSTOMIZED DEVELOPER ENVIRONMENTS

(71) Applicant: Rubrik, Inc., Palo Alto, CA (US)

(72) Inventors: Stefan Dao, Cupertino, CA (US); Kenny To, Santa Clara, CA (US); Pete Yeh, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 119 days.

(21) Appl. No.: 15/844,253

(22) Filed: Dec. 15, 2017

(65) Prior Publication Data

US 2019/0188047 A1    Jun. 20, 2019

(51) Int. Cl.
| | |
|---|---|
| *G06F 15/173* | (2006.01) |
| *G06F 9/50* | (2006.01) |
| *G06F 11/30* | (2006.01) |
| *G06F 9/455* | (2018.01) |

(52) U.S. Cl.
CPC .......... *G06F 9/5077* (2013.01); *G06F 9/5038* (2013.01); *G06F 11/301* (2013.01); *G06F 9/45558* (2013.01); *G06F 2009/4557* (2013.01); *G06F 2009/45562* (2013.01)

(58) Field of Classification Search
CPC .... G06F 9/5005; G06F 9/5027; G06F 9/5038; G06F 9/5044; G06F 9/5055; G06F 9/5077; G06F 11/301; G06F 2009/45562; G06F 2009/4557
See application file for complete search history.

(56) References Cited

U.S. PATENT DOCUMENTS

| | | | | |
|---|---|---|---|---|
| 8,694,400 B1 * | 4/2014 | Certain | ................. | G06Q 30/08 705/35 |
| 9,280,392 B1 * | 3/2016 | Boss | .................... | G06F 9/5011 |
| 9,781,054 B1 * | 10/2017 | Greenfield | ............ | H04L 47/821 |
| 2008/0320142 A1 * | 12/2008 | Hicks | ................. | H04L 67/1097 709/226 |
| 2012/0151063 A1 * | 6/2012 | Yang | .................... | G06F 9/5011 709/226 |
| 2012/0278513 A1 * | 11/2012 | Prevost | ................ | G06F 9/5038 710/39 |
| 2013/0036417 A1 * | 2/2013 | Chen | .................... | G06F 9/5077 718/1 |

(Continued)

*Primary Examiner* — Jonathan A Bui
(74) *Attorney, Agent, or Firm* — Schwegman Lundberg & Woessner, P.A.

(57) ABSTRACT

Systems and techniques are provided for managing and creating customized testing and development environments by a custom environment manager for computer or data management systems. In a specific implementation, the custom environment manager includes request receivers that receive orders associated with a prioritization from custom environment requestors and store the received orders in a request queue that holds multiple orders having different prioritizations and made by different requestors. The custom environment manager also includes pooled resource managers that track available virtual and physical computing resources needed to build custom environments. The custom environment manager also includes configurators that create custom environments based upon prioritization of the orders and available resources and return the custom environment to the requestor of the order.

25 Claims, 14 Drawing Sheets

(56) References Cited

U.S. PATENT DOCUMENTS

| | | | |
|---|---|---|---|
| 2013/0254407 A1* | 9/2013 | Pijewski | G06F 9/5083 709/226 |
| 2014/0123140 A1* | 5/2014 | Motoki | H04L 41/0806 718/1 |
| 2014/0280970 A1* | 9/2014 | Pijewski | H04L 41/0896 709/226 |
| 2015/0106805 A1* | 4/2015 | Melander | G06F 9/45537 718/1 |
| 2015/0135255 A1* | 5/2015 | Theimer | H04L 63/20 726/1 |
| 2016/0188474 A1* | 6/2016 | Wang | G06F 12/0842 711/119 |
| 2018/0102984 A1* | 4/2018 | Dettori | H04L 47/82 |
| 2018/0150339 A1* | 5/2018 | Pan | G06F 9/5027 |
| 2018/0246772 A1* | 8/2018 | Xu | G06F 9/5077 |

* cited by examiner

Request Queue 520

| Order ID 602 | Prioritization 604 | Description 606 | Status 608 | Requester ID 610 | Holding Resource 612 | Time Limit 614 | Optional 616 |
|---|---|---|---|---|---|---|---|
| 101 | 80 | A power outage scenario | Open | 17783 | | 1:00:00 | |
| 102 | 70 | Database with 10K row with 2K rows changing per minute | Open | 20983 | | 100:00:00 | |
| 103 | 100 | A VM with 100GB data | Closed | 45727 | | 20:20:80 | |
| 104 | 50 | 10 VMs with varying amount of data | Open | 24124 | | 1:00:00 | |
| 106 | 40 | A corrupted VM | Fulfilled | 43657 | 10001 | | |
| 107 | 90 | A VM running in Cloud Server A and a VM running in Local Data Center T | Fulfilled | 74555 | 10003, 20001 | 5:00:00 | |
| 108 | 100 | A VM running in Local Data Center | Closed | 32256 | | 2:00:00 | |

FIG. 6

Resource 522

| Resource ID | Description | State | Held by OrderID | Optional |
|---|---|---|---|---|
| 10001 | A corrupted VM | Active | 106 | |
| 10003 | A VM running in Cloud Server A | Active | 107 | |
| 20001 | A VM running in Local Data Center T | Active | | |
| 20023 | Database with 10K rows | Active | | |
| 58922 | A VM in Cloud Server C | Active | | |
| 34657 | A VM in Local Data Center S | Destroyed | | |

Recipe 524

| Scenario ID | Scenario | Required Resources | Optional |
|---|---|---|---|
| S1 | A power outage scenario | A VM in Local Data Center S that shuts down automatically after 5 minutes | |
| S2 | A corrupted VM | A VM in Cloud Server B with corrupted root volume | |

FIG. 8

Order Update 526

| Order Update ID | Order ID | Order Change | New Status | Requester ID | Updated Requester ID | Optional |
|---|---|---|---|---|---|---|
| RU00001 | 101 | A power outage scenario for 10 VMs running in multiple cloud servers | Fulfilled | 17783 | 17783 | |
| RU00005 | 102 | Database with 10K rows with 2K rows changing per minute | Open | 209983 | 10001 | |

FIG. 9

ON-DEMAND PROVISIONING OF CUSTOMIZED DEVELOPER ENVIRONMENTS

FIELD OF THE TECHNOLOGY DISCLOSED

The present invention pertains to creating custom environments for testing or developing computer or data management systems. More particularly, the present invention relates to building custom environments for testing and development of computer or data management systems that includes processes or apparatus for establishing hybrid environments with original operating parameters or data for computer or digital data management systems on both physical data centers and cloud servers, and creating testing scenarios such as maliciously caused destruction, unauthorized or frequent data modifications, power failure, natural disaster, etc.; wherein there is a significant temporal, incremental or sequencing control provided to one or more computers, data management systems, processors, memory, or peripherals, or to data transmission between these systems or components.

BACKGROUND

Modern-day clients tend to run hybrid workloads where multiple virtual machines are running on one or more local data centers and others on one or more cloud servers. A virtual machine is an emulation of a computer system that, like a physical computer, runs an operating system and applications. A virtual machine has virtual devices that provide the same functionality as physical hardware of a physical computer, and have additional benefits in terms of portability, manageability, and security. A local data center or a cloud server may host one or more virtual machines. Virtual machines are usually backed up by the resources of their host.

A local data center is a facility consisting of networked computers and storages that organizations or other entities own and use to organize, process and store large amounts of data. The local data center is physically assessable to its owner.

Some cloud servers may be owned and operated by third party providers and leased to the end user. Organizations and other entities can sign up as clients on one or more cloud servers. A cloud server enables ubiquitous, convenient, on-demand network access to a shared pool of configurable computing resources (e.g., networks, servers, storage, applications, and services) that can be rapidly provisioned and released with minimal management effort or service provider interaction. The cloud server can provide services to organizations or other entities as:

(i) Software as a Service (SaaS)—The clients run the cloud server's applications on the cloud server's computing resources. The applications are accessible from various devices through either a thin client interface, such as a web browser (e.g., web-based email), or a program interface. The client does not manage or control the underlying cloud computing infrastructure including network, servers, operating systems, storage, or even individual application capabilities, with the possible exception of limited user-specific application configuration settings.

(ii) Platform as a Service (PaaS)—The clients can deploy their applications onto the cloud server's computing resources. The application can be acquired or created by the clients using programming languages, libraries, services, and tools supported by the cloud server. The client does not manage or control the underlying cloud server's computing resources including network, servers, operating systems, or storage, but has control over the deployed applications and possibly configuration settings for the application-hosting environment.

(iii) Infrastructure as a Service (IaaS)—The clients can provision processing, storage, networks, and other fundamental computing resources. The clients can deploy and run arbitrary software, which can include operating systems and applications on the provisioned resources. The client does not manage or control the underlying cloud computing infrastructure but has control over operating systems, storage, and deployed applications; and possibly limited control of select networking components (e.g., host firewalls).

Virtual machines running on local data centers and cloud servers have extensive data security requirements and typically need to be continuously available to deliver services to clients. For disaster recovery and avoidance, the local data centers and cloud servers that provide virtual machine capability need to avoid data corruption and service lapses to clients. Therefore, the local data centers and cloud servers periodically take snapshots of the running virtual machines. A snapshot is a copy of the virtual machine's content at a given point in time. Snapshots can be used to restore a virtual machine to a particular point in time when a failure or system error occurs. The computing resources can take multiple snapshots of a virtual machine to create multiple possible point-in-time restore points. When a virtual machine reverts to a snapshot, current virtual machine's data volumes and memory states are deleted, and the snapshot becomes the new parent snapshot for that virtual machine.

Snapshots are intended to store the virtual machine data for as long as deemed necessary to make it feasible to go back in time and restore what was lost. As the main objective of snapshots is long-term data storage, various data reduction techniques are typically used by a snapshot manager in computing resources to reduce the snapshot size and fit the data into the smallest amount of disk space possible. This includes skipping unnecessary swap data, data compression, and data deduplication, which removes the duplicate blocks of data and replaces them with references to the existing ones. Because snapshots are compressed and duplicated to save storage space, they no longer look like virtual machines and are often stored in a special format. As snapshots just a set of files, the snapshot repository is a folder, which can be located anywhere: on a dedicated server, storage area network (SAN) or dedicated storage in a computing resources' infrastructures.

An opportunity arises for a computer or data management system to keep a snapshot history, stored in sequence, and spanning multiple virtual machines on multiple local data centers and cloud servers, configure scheduling of snapshot capture across multiple systems, and provide improved disaster recovery in the event of data loss due to natural disasters, man-made disasters such as acts of terrorism, and/or virus attacks. To ensure the integrity of the computer or data management system, various functionalities of the system need to be tested in various testing scenarios and environments. Furthermore, development environments need to be provided to the developers of the computer or data management systems. Various testing or development environments need a varying amount of physical resources on the local data centers and virtual resources on the cloud servers. A data management system developer or tester may create his/her development or testing environment. The tester or developer will have the responsibility of locating hardware and installing and configuring one or more software to create the intended environment. Testers and developers will waste precious time on setting up such environments, instead of testing or developing their code. The testers and developers may have to pay significant costs for ongoing management and operation of the created environments, including cleanup of the resources and preparation for the next use.

A tester or developer may also be given a standard environment to test or develop their data management system code. The standard environment may package as many different items into one environment. In some cases, the standard testing or development environments may be adequate. In some cases, the standard testing or development environments may be inadequate to test the functionalities of the data management systems. In some cases, the standard testing or development environments may have some unused resources or resources that are not in use majority of the time.

It is desirable to provide a system that can more effectively and automatically let developers and testers of data management systems acquire a custom environment with resources and characteristics they need.

SUMMARY

A system and a method are provided that can be used for managing custom environments for testing and developing computer or data management system. The disclosed method and system includes one or more request receivers that: (i) receive orders from developers and testers including requesting custom environments or modifications to custom environments, each requested order including a prioritization that depends upon a quota for prioritized allocation of resources of the requestor making the order; and (ii) store the orders in a request queue that holds multiple orders having different prioritizations and made by different requestors. The system and method further include one or more pooled resource managers that track available resources in a resource pool comprising of virtual resources and physical resources. The system and method further include one or more configurators that create custom environments based upon multiple orders received by: (i) retrieving an order in the request queue; (ii) checking whether the order retrieved has higher prioritization than other orders in the request queue and whether resources are available in the resource pool to meet the order; (iii) whenever the order has a higher prioritization than other orders in the request queue and there are sufficient resources available in the resource pool to fill the order, allocating available virtual resources and physical resources from the resource pool to create or customize a custom environment specified in the order; and (d) at least commence returning the custom environment to the requestor of the order.

Embodiments of the technology described herein, or elements thereof, can be implemented in the form of a computer product including a non-transitory computer-readable storage medium with the computer usable program code for performing the method steps indicated. Furthermore, embodiments of the invention or elements thereof can be implemented in the form of an apparatus including a memory and at least one processor that is coupled to the memory and operative to perform exemplary method steps. Yet further, in another aspect, embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

Thus, a technology is provided that enables developers and testers of computer or data management system acquire customized environment with multiple virtual machines running on local data centers and others on cloud servers. The disclosed technology enables developers and tester to have customized environments by requesting specific resources which satisfy their requirements with no additional add-ons. The disclosed technology also enables the developers and testers to receive various scenarios to check various functionalities of the computer or data management system. The disclosed technology enables allocation of testing and development resources more granularly, pre-allocate resources which are frequently used, and provide greater availability for testing or development resources. Having the disclosed technology manage the physical and computing resources enables cost-effectiveness due to economies of scale. Since the disclosed technology accurately tracks orders of the custom environments for testing and development purposes, the management costs of the resources are consolidated, including the cost of using virtual resources by third party vendors. Any resources a tester or developer no longer needs can be made available to other users. Embodiments advantageously employ the disclosed technology to create various testing scenarios, such as power outages, corrupted data sources, natural disaster, etc.

These and other features, aspects, and advantages of the invention will become apparent from the following detailed description of illustrative embodiments thereof, which is to be read in connection with the accompanying drawings.

BRIEF DESCRIPTION OF THE DRAWINGS

FIG. 6 is a symbolic drawing indicating how the request queue database in FIG. 5 is organized, according to an embodiment of the invention.

FIG. 7 is a symbolic drawing indicating how the resource database in FIG. 5 is organized, according to an embodiment of the invention.

FIG. 8 is a symbolic drawing indicating how the recipe database in FIG. 5 is organized, according to an embodiment of the invention.

FIG. 9 is a symbolic drawing indicating how the order update database in FIG. 5 is organized, according to an embodiment of the invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

Figure 1:
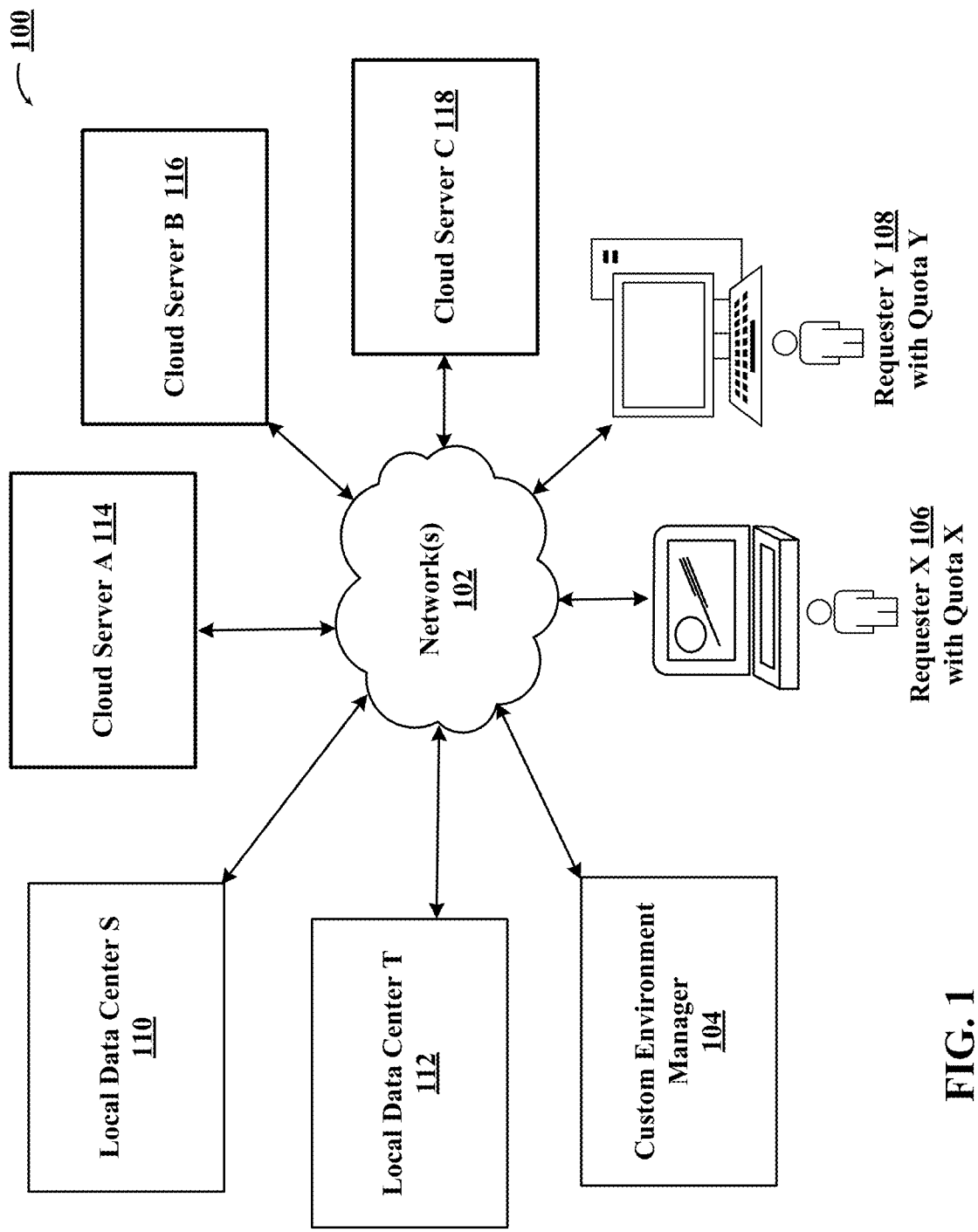
FIG. 1 illustrates an architectural level schematic of an example environment that includes a custom environment manager that creates custom testing and development environments.

FIG. 1 illustrates an architectural level schematic of an example environment that includes a custom environment manager that creates custom testing and development environments for testers and developers. In one embodiment, the networked computing environments 100 may include an infrastructure that provides development and testing environments for software, data processing, and/or data storage service code to requesters of custom environments accessing the services via the networked computing environment. Because FIG. 1 is an architectural diagram, certain details are intentionally omitted to improve the clarity of the description. The discussion of FIG. 1 will be organized as follows. First, the elements of the figure will be described, followed by their interconnections.

The system 100 includes a custom environment manager 104, a cloud server A 114, a cloud server B 116, a cloud server C 118, a requester X 106 with a quota X, a requester Y 108 with a quota Y, a local data center S 110, a local data center T 112, and the network(s) 102. For the sake of clarity, only three cloud servers, two local data centers, and two requesters are shown to be connected to the custom environment manager 104 through the network(s) 102. However, any number of cloud servers, local data centers, and requesters can be connected to the custom environment manager 104 through the network(s) 102. The interconnection of the elements of system 100 will now be described. Network(s) 102 couples the custom environment manager 104, the cloud server A 114, the cloud server B 116, the cloud server C 118, the requester X 106, the requester Y 108, the local data center S 110, and the local data center T 112, all in communication with each other (indicated by solid double-arrowed lines).

The actual communication path through the internet can be point-to-point over public and/or private networks. The communications can occur over a variety of network(s) 102, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The cloud server A 114, the cloud server B 116 and the cloud server C 118 may comprise a cloud computing environment providing Software-as-a-Service (SaaS), Product-as-a-Service (SaaS) or Infrastructure-as-a-Service (IaaS) services. Examples of common cloud servers today include Amazon Web Services AWS™, Digital Ocean™, Microsoft Azure™, Rackspace Open Cloud™, Google Compute Engine™, HP Enterprise Converged Infrastructure™, IBM SmartCloud Enterprise™, IBM SmartCloud Enterprise™, CloudStack™, OpenStack™, Cisco Cloud Infrastructure Solutions™, CenturyLink Cloud™, Netrepid™, Green Cloud Technologies™, Amazon VPC™, CloudStack™, Linode™ and so on. In the technology described herein, the cloud server A 114, the cloud server B 116 and the cloud server C 118 can use any of the platforms described.

Referring to FIG. 1, a requester X 106 and a requester Y 108 may request custom environments from the custom environment manager 104 for code development and testing of data management system. The data management system being tested or developed may be used for administering services, including backup, instant recovery, replication, search, analytics, archival, compliance, and data management across the local data centers 110 and 112, and cloud servers 114, 116, and 118. Requesters 106, 108 may request a custom environment from the custom environment manager 104, the requested custom environment including running multiple virtual machines on the cloud server A 114, the cloud server B 116, the cloud server C 118, the local data center S 110 and/or the local data center T 112. Requesters 106, 108 may request custom environments from the custom environment manager 104, which simulate certain scenarios, e.g., power outages, corrupted data sources, natural disaster, man-made disasters such as acts of terrorism, and/or virus attacks, etc. Requesters 106, 108 may request that the custom environment manager 104 update the acquired custom environments. The request update may include adding comments, extending the time limit of the order, changing requesters, closing the order, adding more resources to the order or removing resources from the order.

Requesters 106, 108 may run a script to request custom environments from the custom environment manager 104. The custom environment manager 104 may provide a user interface (e.g., a web-based interface or a graphical user interface) or a custom plugin that enables requesters to request custom environments. A user interface may be implemented using, e.g., web technologies (e.g., Apache web server, Python/Django web application framework, and OpenSSL certificate and SSL implementation, as is well known in the art). A user interface may alternatively be implemented as a Windows application or DLL (Dynamic-Link Library). Many other user interface technologies can also be used. Examples of electronic devices which can deploy such user interfaces include all varieties of computers, workstations, laptop computers, handheld computers, and smartphones.

In one embodiment, the priority with which the custom environment manager 104 fulfills orders for custom environments received from a requester depends upon the quota of requests assigned to the requester. Referring to FIG. 1, requester X 106 has a quota of X number of custom environments and requester Y 108 has a quota of Y number of custom environments. Quota-based priority enables implementations to limit a requester's usage of resources within a period of time. Before a requester uses up his/her quota, the orders for custom environments from that user is directed to a higher priority. When a requester uses up his/her quota, the subsequent orders of custom environments from that user is directed to a lower priority.

Figure 2:
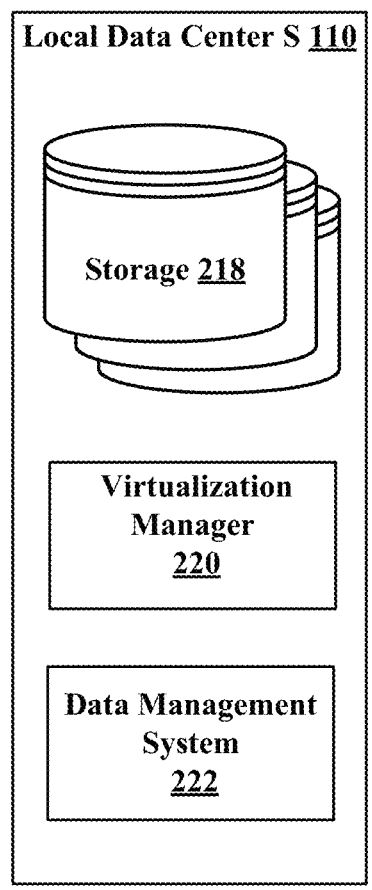
FIG. 2 illustrates an example of a local data center.

FIG. 2 illustrates an example of a local data center, such as local data center S 110. The local data center S 110 may include a data management system 222, one or more virtualization managers, such as the virtualization manager 220, in communication with one or more storage devices, such as storage device 218. The one or more virtualization managers may also be in communication with the data management system 222. The virtualization manager 220, storage device 218, and data management system 222 may be in communication with each other via a networking fabric connecting servers and data storage units within the physical computing resource to each other. The data management system 222 may include a system for backing up virtual machines and/or files within a virtualized infrastructure. The virtualization manager 220 may be used to create and manage one or more virtual machines associated with a virtualized infrastructure. The one or more virtual machines may run various applications, such as a database application or a web server. The storage device 218 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a local data center may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives). The virtualization manager 220 may manage a virtualized infrastructure inside the local data center and perform management operations associated with the virtualized infrastructure. The virtualization manager 220 may manage the provisioning of virtual machines running within the virtualized infrastructure and provide an interface to computing devices interacting with the virtualized infrastructure. In one example, the virtualization manager 220 may set a virtual machine into a frozen state in response to a snapshot request made via an application programming interface (API) by the data management system 222. Setting the virtual machine into a frozen state may allow a point in time snapshot of the virtual machine to be stored or transferred. The virtualization manager 220 may then transfer the snapshot of the virtual machine to a snapshot storage in response to a request made by the data management system 222. After the data associated with the point in time snapshot of the virtual machine has been transferred to the snapshot storage the virtual machine may be released from the frozen state (i.e., unfrozen). The virtualization manager 220 may perform various virtual machine related tasks, such as cloning virtual machines, creating new virtual machines, monitoring the state of virtual machines, moving virtual machines between physical hosts for load balancing purposes, and facilitating backups of virtual machines.

In the embodiment illustrated in FIG. 2, the data management system 222 may include a data management system for backing up virtual machines in the local data center S 110. Protection policies may be assigned for the virtual machines running on each of the cloud servers (cloud server A 114, cloud server B 116 and cloud server C 118) and local data center S 110 through the data management system 222. The data management system 222 may also restore any corrupted virtual machine in any of the cloud servers in communication with the data management system 222.

Figure 3:
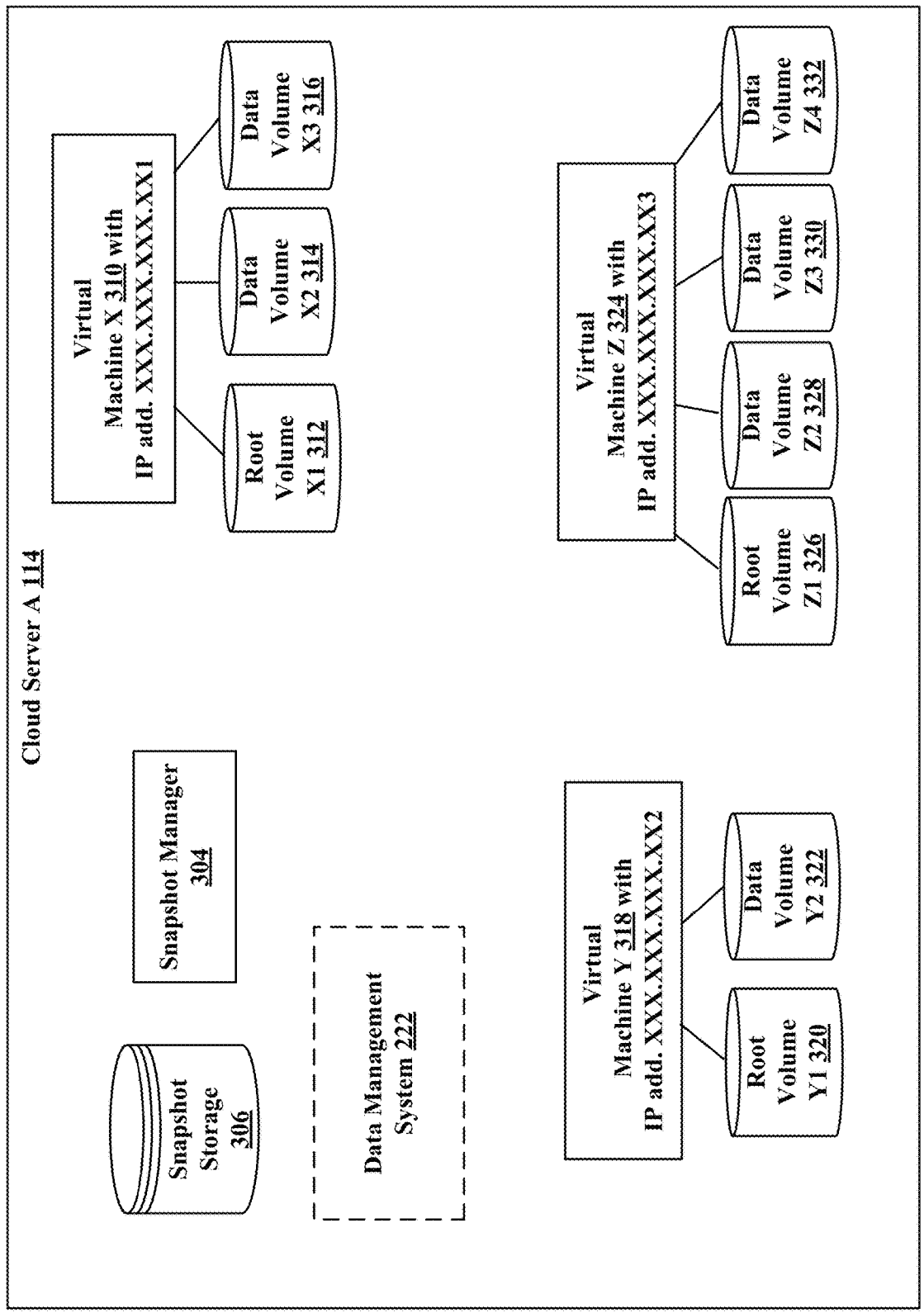
FIG. 3 illustrates an example of a cloud server.

FIG. 3 illustrates an example of a cloud server, such as cloud server A 114. A user with an account on a cloud server, such as custom environment manager 104, may run one or more virtual machines on the cloud server's platform. Each running virtual machine has its own Internet Protocol (IP) address. Each virtual machine has a root volume and one or more data volumes. A volume is defined as virtual storage in the virtual machine and is connected to the virtual machine. A root volume contains the operating system of the virtual machine. A root volume may be created when a virtual machine is initialized. When the virtual machine is deleted, the root volume is also deleted. A data volume is defined as the second or subsequent volume among those connected to a virtual machine. The data volume does not contain any part of the operating system of the virtual machine. A data volume can be attached or detached to a virtual machine. A data volume of a first virtual machine can be detached from the first virtual machine and attached to a second virtual machine.

Referring to FIG. 3, a requester of a custom environment is running a virtual machine X 310 with IP address XXX.XXX.XXX.XX1, virtual machine Y 318 with IP address XXX.XXX.XXX.XX2, and virtual machine Z 324 with IP address XXX.XXX.XXX.XX3 in the cloud server A 114. The virtual machine X 310 with IP address XXX.XXX.XXX.XX1 has a root volume X1 312, a data volume X2 314 and a data volume X3 316. The virtual machine Y 318 with IP address XXX.XXX.XXX.XX2 has a root volume Y1 320, and a data volume Y2 322. The virtual machine Z 324 with IP address XXX.XXX.XXX.XX3 has a root volume Z1 326, a data volume Z2 328, a data volume Z3 330 and a data volume Z4 332.

The cloud server A 112 may also include a data management system 222. The data management system 222 may be run from the cloud server (e.g., the software-level components may be installed on the cloud server). In addition to the data management system 222 being hosted in local data centers 110 and 112, cloud servers (cloud server A 114, cloud server B 116 and cloud server C 118) may include a data management system 222. Protection policies are assigned for the virtual machines running for each of the cloud servers (cloud server A 114, cloud server B 116 and cloud server C 118) through the cloud server's respective data management system.

The cloud server A 114 may further include a snapshot manager 304 and a snapshot storage 306. The snapshot manager 304 may follow a backup schedule to capture snapshots of a virtual machine at a particular point in time or one or more data volumes associated with the virtual machine at the particular point in time. In one example, the backup schedule is based on the service level agreements (SLA) that prevails between the data management system and the users. An SLA defines specific aspects of the service, including how often to take virtual machine snapshots and how long to keep the snapshots, as agreed between the data management system and the users. The snapshots captured by the snapshot manager 304 can be stored in a dedicated storage, snapshot storage 306. In some embodiments, a plurality of versions of a virtual machine may be stored as a base file associated with a complete image of the virtual machine at a particular point in time (e.g., Version V1/Time T1 and Version V4/Time T4) and one or more incremental files (also referred to as "incrementals") (e.g., Version V2/Time T2; Version V3/Time T3; and Version V5/Time T5) associated with forward and/or reverse incremental changes derived from the base file. An incremental file may comprise a forward incremental file or a reverse incremental file. A forward incremental file may include a set of data representing changes that have occurred since an earlier point in time snapshot of a virtual machine. To generate a snapshot of the virtual machine corresponding to a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding to a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file). In some embodiments, each version of the plurality of versions of a virtual machine may correspond to a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals, reverse incrementals, or a combination of both forward incrementals and reverse incrementals.

Figure 4:
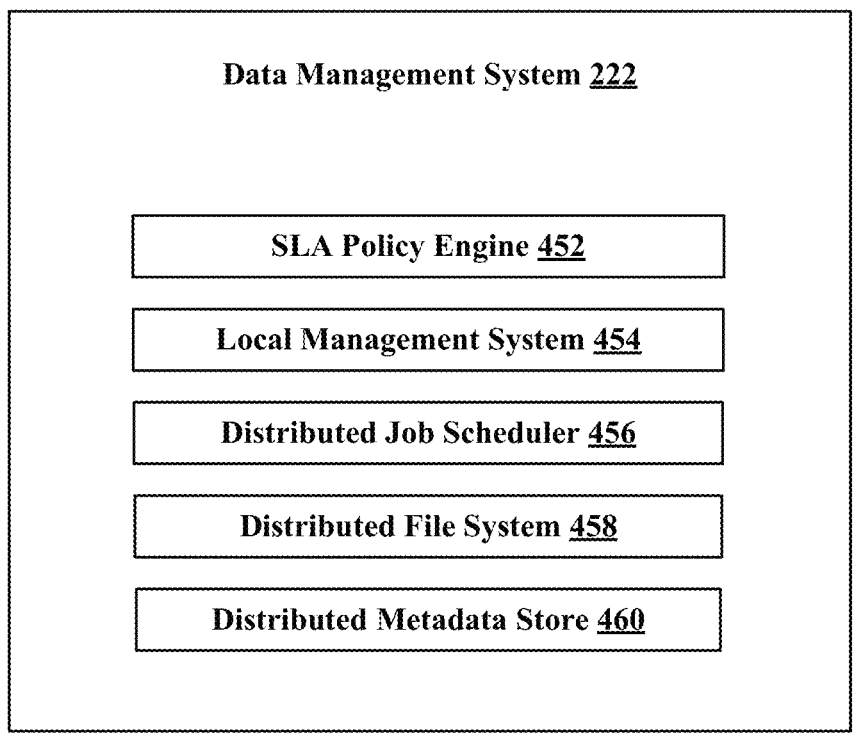
FIG. 4 illustrates an example of a data management system.

FIG. 4 illustrates an example of a data management system 222. In one embodiment, the data management system 222 may manage the extraction and storage of virtual machine snapshots captured at different time points of one or more virtual machines running in the virtualization manager within the local data centers. In one embodiment, the data management system 222 may manage the snapshot capturing schedule of one or more virtual machines running on one or more cloud servers. In one embodiment, the data management system 222 may manage the extraction and storage of virtual machine snapshots captured at different time points of one or more virtual machines running in the virtualization manager 220 within the local data centers and the snapshot capturing schedule of one or more virtual machines running on one or more cloud servers. The data management system 222 may restore a point in time version of a virtual machine or restore point in time versions of one or more files located on the virtual machine.

Referring to FIG. 4, the data management system 222 may have several software-level components. The software-level components of the data management system 222 may include an SLA policy engine 452, a local management system 454, a distributed job scheduler 456, a distributed metadata store 460, and a distributed file system 458. In one embodiment, the software-level components of the data management system 222 may be run using a dedicated hardware-based appliance with one or more processors and memory system. In another embodiment, the software-level components of the data management system 222 may be run on a cloud server (e.g., the software-level components may be installed on the cloud server's platform).

The SLA policy engine 452 includes intelligence to determine the snapshot capturing schedule to meet terms of service level agreements between the data management system 222 and the users of the data management system, with specific aspects of the service, including how often to take virtual machine snapshots and how long to keep the snapshots.

The distributed file system 458 may present itself as a single file system in the data management system 222 and is shared by one or more physical machines connected to the data management system 222. Each file stored in the distributed file system 458 may be partitioned into one or more chunks. Each of the one or more chunks may be stored within the distributed file system 458 as a separate file. The files stored within the distributed file system 458 may be replicated or mirrored over a plurality of physical machines, thereby creating a load-balanced and fault-tolerant distributed file system. In one example, data management system 222 may include ten physical machines and a first file corresponding with a snapshot of a virtual machine may be replicated and stored on three of the ten machines.

The distributed metadata store 460 may include a distributed database management system that provides high availability without a single point of failure. In one embodiment, the distributed metadata store 460 may comprise a database, such as a distributed document-oriented database. The distributed metadata store 460 may be used as a distributed key-value storage system. In one example, the distributed metadata store 460 may comprise a distributed NoSQL key-value store database. In some cases, the distributed metadata store 460 may include a partitioned row store, in which rows are organized into tables or other collections of related data held within a structured format within the key-value store database. A table (or a set of tables) may be used to store metadata information associated with one or more files stored within the distributed file system 460. In one embodiment, a new file corresponding with a snapshot of a virtual machine may be stored within the distributed file system 458 and metadata associated with the new file may be stored within the distributed metadata store 460.

In some cases, the distributed metadata store 460 may be used to manage one or more versions of a virtual machine. Each version of the virtual machine may correspond with a full image snapshot of the virtual machine stored within the distributed file system 458 or an incremental snapshot of the virtual machine (e.g., a forward incremental or reverse incremental) stored within the distributed file system 458. In one embodiment, the one or more versions of the virtual machine may correspond to a plurality of files. The plurality of files may include a single full image snapshot of the virtual machine and one or more incrementals derived from the single full image snapshot. The single full image snapshot of the virtual machine may be stored using a first storage device of a first type (e.g., an HDD) and the one or more incrementals derived from the single full image snapshot may be stored using a second storage device of a second type (e.g., an SSD). In this case, only a single full image needs to be stored, and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 456 may be used for scheduling backup jobs that acquire and store virtual machine snapshots for one or more virtual machines in the local data centers and the cloud servers over time. The distributed job scheduler 456 may follow a backup schedule to backup an entire image of a virtual machine at a particular point in time or one or more data volumes associated with the virtual machine at the particular point in time. In one example, the backup schedule is the SLA agreement that prevails between the data management system 222 and the users of the data management system. Each of the one or more tasks associated with a job may be run on a particular processor of the data management system 222. The local management system 454 may comprise an application running on the data management system 222 that manages and stores one or more snapshots of a virtual machine in the local data center.

Custom Environment Manager

Figure 5:
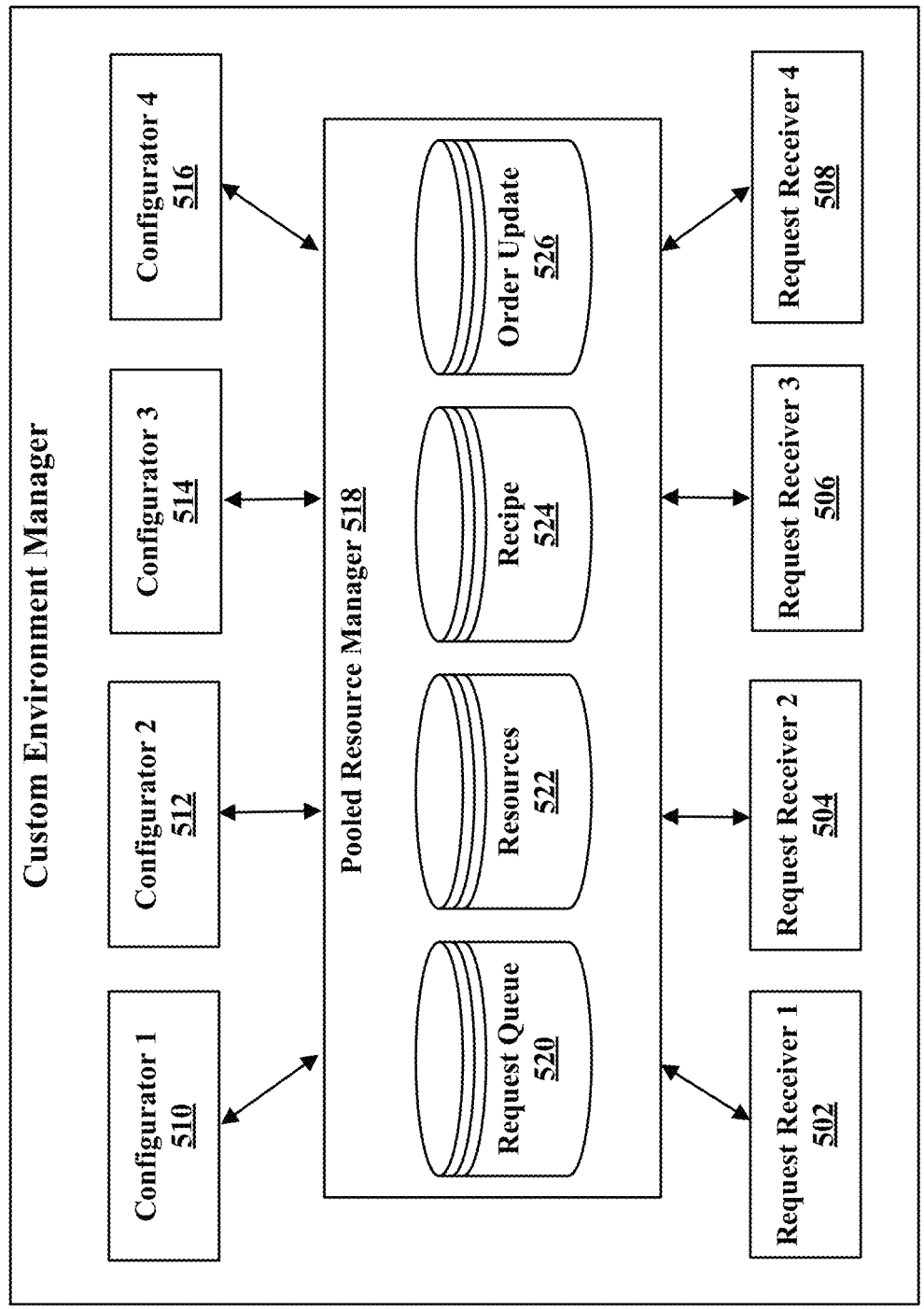
FIG. 5 illustrates a custom environment manager, according to an embodiment of the invention.

FIG. 5 illustrates a custom environment manager 104, according to an embodiment of the invention. The custom environment manager 104 includes software components referred to herein as a pooled resource manager 518, a request receiver 1 502, a request receiver 2 504, a request receiver 3 506, a request receiver 4 508, a configurator 1 510, a configurator 2 512, a configurator 3 514, and a configurator 4 516. For the sake of clarity, only one pooled resource manager, four request receivers, and four configurators are shown to be included in the custom environment manager 104. However, the custom environment manager 104 may have any number of pooled resource managers, request receivers, and configurators.

The pooled resource manager 518 manages and stores the orders and order updates for custom environments received from requesters, available virtual resources in the cloud servers, and available physical resources in the local data centers. Furthermore, the pooled resource manager 518 includes a request queue database 520, a resource database 522, a recipe database 524, and an order update database 526. As used herein, the term "database" does not necessarily imply any unity of structure. For example, two or more separate databases, when considered together, still constitute a "database" as that term is used herein. Databases can include tables. The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM InfoSphere™, Borealis™, and Yahoo! S4™.

FIG. 6 is a symbolic drawing indicating how the request queue database 520 in FIG. 5 is organized, according to an embodiment of the invention. Any order request for custom environments received by the custom environment manager 104 is saved in the request queue database 520. A request for a custom environment is chosen to be fulfilled by selecting an unfulfilled order from the request queue database 520. After an order for a custom environment is fulfilled, the status of that request is updated in the request queue database 520. The request queue database 520 includes a unique order ID 602 for each request for custom environment, a priority for the order 604, a order description 606, a status of the order 608, a requester ID 610, IDs of the physical and virtual resources the order is using 612, and a time limit for the order 614. In some embodiments, the time limit 614 is the amount of time a requester can hold the resources requested in the custom environment order. The status of an order may be open, closed or fulfilled. An open status indicates that the order hasn't been fulfilled yet. A fulfilled status indicates that a custom environment specified by the requester has been created and returned to the requester. A closed status indicates an order that has been fulfilled, and has been returned by the requester or time limit has expired. As shown in FIG. 6, an example of order entries include an open order with order ID 101 made by requester 17783 for a power outage scenario and a time limit of one hour. Another example of an order entry includes a fulfilled order with request ID 106 made by requester 43657 for a corrupted virtual machine scenario and with no time limit. In some embodiments, the request database 520 may include other optional request information 616 that might be helpful for the functionality of the pooled resource manager 518, e.g., whether the request is a maintenance request, and so on.

FIG. 7 is a symbolic drawing indicating how the resource database 522 in FIG. 5 is organized, according to an embodiment of the invention. The resource database 522 keeps track of available physical resources in the local data centers and virtual resources in the cloud servers. An order for a custom environment is fulfilled by selecting available resources from the resource database 522. After a resource is selected to fulfill an order for a custom environment, the state of that resource is updated in the resource database 522. The resource database 522 includes a unique resource ID 702 for each resource, a description of the resource 704, a status of the resource 706, and the ID of the order holding the resource 708. The state of a resource may be active or destroyed. An active status indicates that the resource is available to fulfill orders for custom environments, if not held by a current order. A destroyed status indicates that the resource does not exist anymore. As shown in FIG. 7, an example of a resource entry includes an active resource with resource ID 10001 held by order ID 106 for a corrupted virtual machine. Another example of a resource entry include a destroyed resource with resource ID 34657 for a virtual machine in local data center S. In some embodiments, the resource database 522 may include other optional resource information 708 that might be helpful for the functionality of the pooled resource manager 518.

FIG. 8 is a symbolic drawing indicating how the recipe database 524 in FIG. 5 is organized, according to an embodiment of the invention. The recipe database 524 keeps track ingredients for commonly requested custom environments. The recipe database 524 can be consulted before fulfilling an order for a custom environment. The recipe database 524 includes a unique recipe ID 802 for each recipe, a scenario for the recipe 804, and the resources required to build a custom environment with that scenario 806. As shown in FIG. 8, an example of a recipe entry includes a recipe with recipe ID S1 for power outage scenario that includes a virtual machine in local data center S that shuts down automatically after five minutes. In some embodiments, the recipe database 524 may include other optional resource information 808 that might be helpful for the functionality of the pooled resource manager 518.

FIG. 9 is a symbolic drawing indicating how the order update database 526 in FIG. 5 is organized, according to an embodiment of the invention. Any order updates for custom environments received by the custom environment manager 104 are saved in the order update database 526. The order update database 526 may be consulted when a request for a custom environment is being fulfilled. The order update database 526 includes a unique order update ID 902 for each order update, the order ID 602 of the order the update is for, the change 904 requested in the custom environment in the order update, a status for the order update 906, a requester ID of the original requester 610, and a requester ID of the order update 908. The status of an order update may be open or fulfilled. An open status indicates that the order update hasn't been fulfilled yet. A fulfilled status indicates that order update has been taken into consideration. As shown in FIG. 9, an example of an order update entry includes a fulfilled order update with ID RU00001 made by requester 17783 for a power outage scenario for ten virtual machines running on multiple cloud servers. In some embodiments, the order update database 526 may include other optional request information 910 that might be helpful for the functionality of the pooled resource manager 518.

Referring to FIG. 5, the request receivers 502, 504, 506 and 508 receives orders and order updates for custom environments from the requesters, and saves the orders and the order updates received in the request queue database 520 and order update database 526 respectively in the pooled resource manager 518.

The configurators 510, 512, 514 and 516 retrieve an order with the highest priority from the request queue 520 and check whether the order retrieved has higher prioritization than other orders in the request queue and whether resources are available in the resource database 522 to meet the request. If the selected order has a higher prioritization than other orders in the request queue, and there are sufficient resources available in the resource pool to fill the order, the configurators 510, 512, 514 and 516 allocate available virtual resources and physical resources from the resource pool to create or customize the custom environment specified, and return the custom environment to the requestor of the custom environment.

In one embodiment, the custom environment manager 104 may be implemented with a queuing application and a messaging application. A queuing application may be used to maintain a queue of custom environments order requests from the requesters. A messaging application may be used by the pooled resource manager 518, the request receivers 502, 504, 506, 508, and the configurators 510, 512, 514, 516 to communicate with each other. Examples of common queuing applications today include Amazon Simple Queue Service™ (Amazon SQS), Beanstalkd™, Celery™, Delayed: Job™, Disque, Gearman™, Huey™, Kue™, queue_Classic™, Resque™ and Zagar™. Examples of common messaging applications today include ActiveMQ™, Amazon Simple Queue Service™ (Amazon SQS), Apollo™, Darner™, HornetQ™, IronMQ™, Apache Kafka™, Kestrel™, Mappedbus™, Message Bus™, Nanomsg™, NATS™, QDB™, Apache Qpid™, RabbitMQ™, RestMQ™, RQ™ Siberite™ and Zagar™.

In some embodiments, custom environment for development can be provided from pre-bootstrapped images that can be quickly deployed as a container through a container deployment system. Examples of common container applications today include Docker™, Ansible™, Chroot™, Imctfy™, LXC™, OpenVZ™, Virtuozzo™, and so on. Examples of common container deployment applications include Kuberneters™, Messos™, and Swarm™.

In some embodiments, the custom environment manager 104 may predict future requests for custom environments and maintain a supply of ready or partially ready resources in anticipation of typical demand. The custom environment manager 104 may use the resources that are ready to be used to fulfill orders, therefore performing minimal preparation. If resources are constrained due to high demand, the custom environment manager 104 may use ingredients from other computing resources to prepare an equivalent custom environment. If a resource is found to be unusable and no other suitable substitution for that resource is there, the custom environment manager 104 may find another suitable resource currently being prepared for a later order, and fulfill the current order with that resource.

Requesting a Custom Environment

Figure 10:
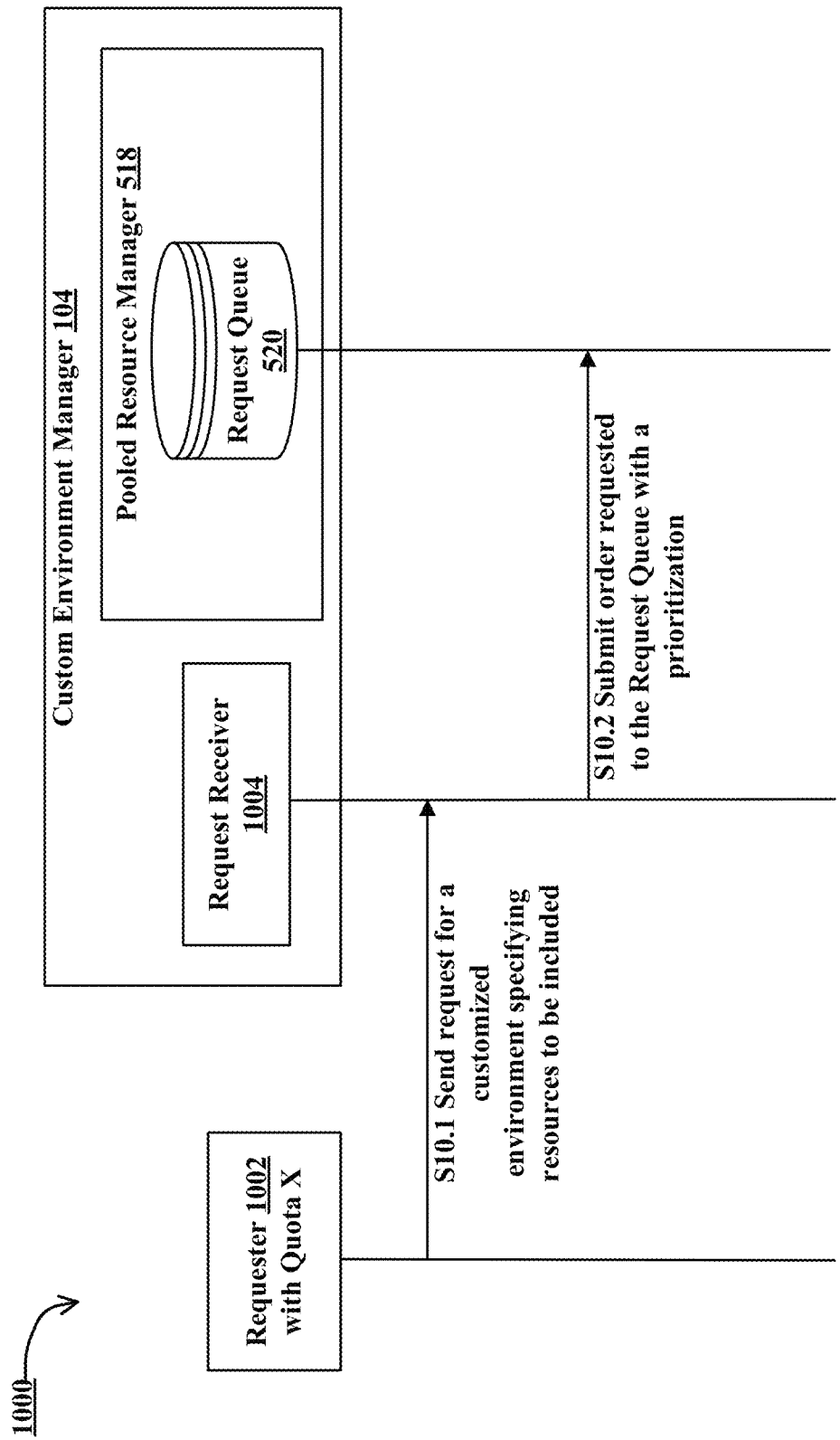
FIG. 10 is a sequence diagram illustrating a representative method of processing new requests for custom environments by the custom environment manager.

FIG. 10 is an example workflow 1000 illustrating a representative method processing new order requests for custom environments by the custom environment manager 104. In some embodiments, the actions in the workflow may be performed in different orders and with different, fewer or additional actions than those illustrated in FIG. 10. Multiple actions can be combined in some implementations.

FIG. 10 includes workflow 1000 that begins at step S10.1 when a requester 1002 requests an order for a custom environment to a request receiver 1004 in the custom environment manager 104 and specifies the resources to be included.

Workflow 1000 continues at step S10.2 when the request receiver 1004 submits the order to the request queue database 520 located in the pooled resource manager 518 in the custom environment manager 104.

Fulfilling an Order for a Custom Environment

Figure 11:
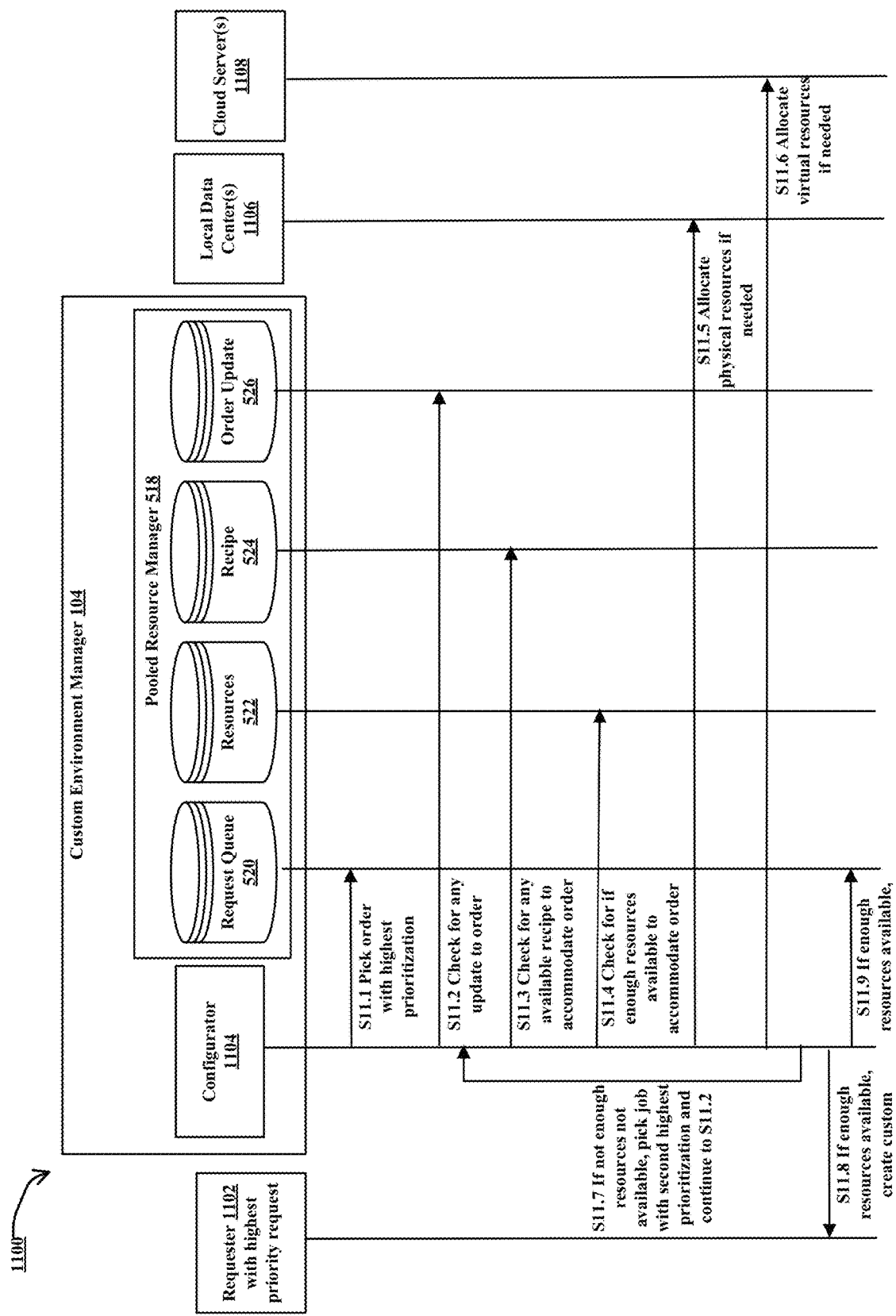
FIG. 11 is a sequence diagram illustrating a representative method of fulfilling an order for a custom environment by the custom environment manager.

FIG. 11 is an example workflow 1100 illustrating a representative method of fulfilling an order for a custom environment by the custom environment manager 104. In some embodiments, the actions in the workflow may be performed in different orders and with different, fewer or additional actions than those illustrated in FIG. 11. Multiple actions can be combined in some implementations.

FIG. 11 includes workflow 1100 that begins at step S11.1 when a configurator 1104 selects an order with the highest prioritization requested by requester 1102 from the request queue database 520 located in the pooled resource manager 518 in the custom environment manager 104.

Workflow 1100 continues at step S11.2 where the configurator 1104 checks whether there is an order update for the selected order in the order update database 526 located in the pooled resource manager 518 in the custom environment manager 104.

At step S11.3, the configurator 1104 checks whether there is any recipe available to fulfill the selected order in the recipe database 524 located in the pooled resource manager 518 in the custom environment manager 104.

At step S11.4, the configurator 1104 checks whether enough physical and virtual resources are available to fulfill the selected order in the resource database 522 located in the pooled resource manager 518 in the custom environment manager 104.

At step S11.5, the configurator 1104 allocates physical resources on one or more local data centers 1106 if enough physical computing resources are not available.

At step S11.6, the configurator 1104 allocates virtual resources on one or more cloud servers 1108 if enough virtual computing resources are not available.

At step S11.7, if enough resources to fulfill the selected order are not available, the configurator 1104 selects an order with second highest prioritization from the request queue 520 located in the pooled resource manager 518 in the custom environment manager 104 and attempts to fulfill the selected second order.

At step S11.8, if enough resources to fulfill the selected order are available, the configurator 1104 creates the custom environment and returns the custom environment to the requester 1102.

At step S11.8, the configurator 1104 updates the order status in the request queue database 520 located in the pooled resource manager 518 in the custom environment manager 104.

Updating a Custom Environment

Figure 12:
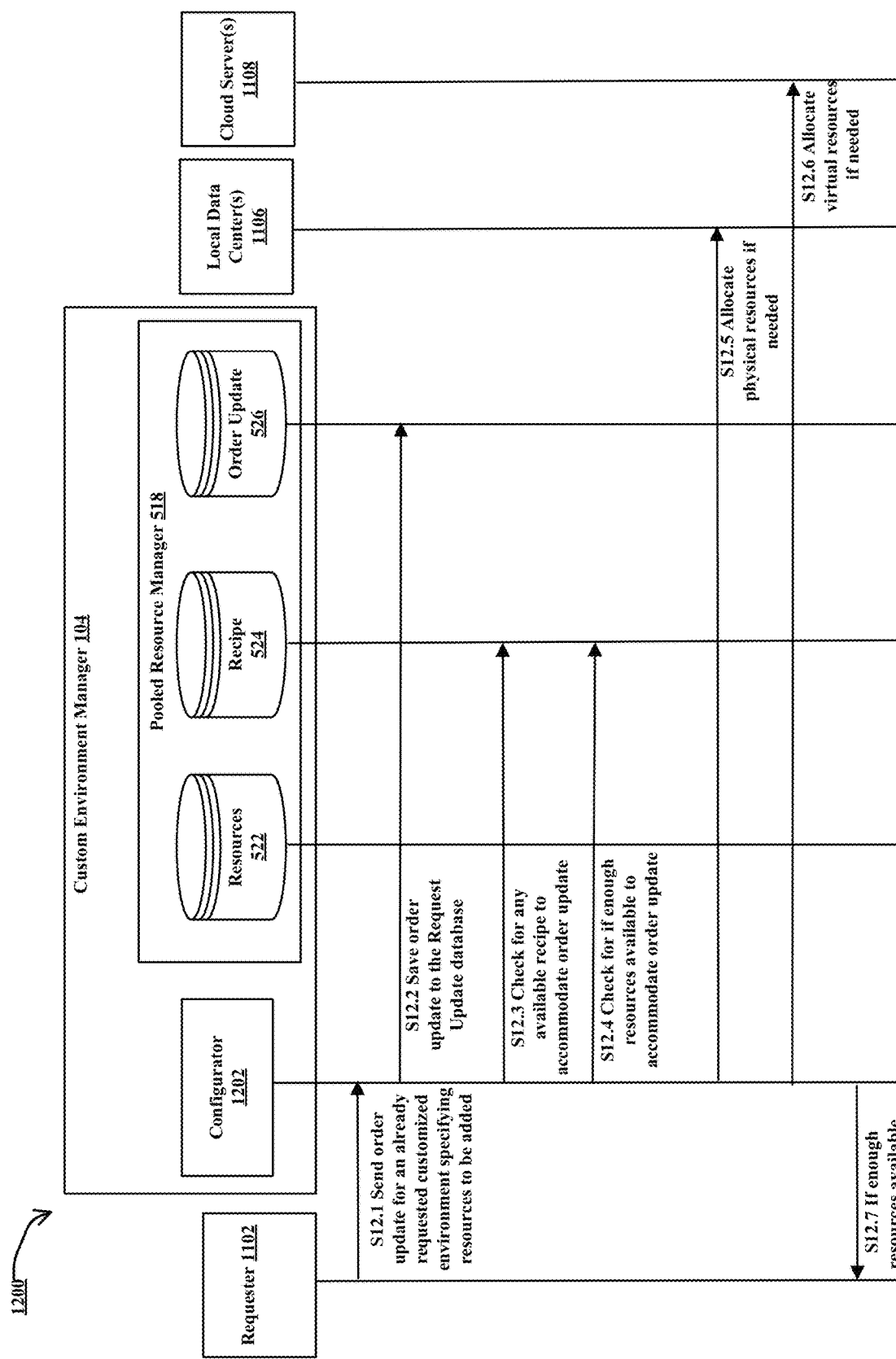
FIG. 12 is a sequence diagram illustrating a representative method of updating an order for a custom environment by the custom environment manager.

FIG. 12 is an example workflow 1200 illustrating a representative method of updating an order request for a custom environment by the custom environment manager 104. In some embodiments, the actions in the workflow may be performed in different orders and with different, fewer or additional actions than those illustrated in FIG. 12. Multiple actions can be combined in some implementations.

FIG. 12 includes workflow 1200 that begins at step S12.1 when a configurator 1104 receives an order update from requester 1102. Requester 1102 may request the configurator 1202 to add comments, extend the time limit of the order, change the requester, close the order, add more resources to the order or remove resources from the order.

Workflow 1200 continues at step S12.2 where the configurator 1202 saves the order update in the order update database 526 located in the pooled resource manager 518 in the custom environment manager 104.

At step S12.3, the configurator 1202 checks whether there is any recipe available to fulfill the order update in the recipe database 524 located in the pooled resource manager 518 in the custom environment manager 104.

At step S12.4, the configurator 1104 checks whether enough physical and virtual computing resources are available to fulfill the order update in the resource database 522 located in the pooled resource manager 518 in the custom environment manager 104.

At step S12.5, the configurator 1104 allocates physical resources on one or more local data center 1106 if enough physical computing resources are not available.

At step S12.6, the configurator 1104 allocates virtual resources on one or more cloud servers 1108 if enough virtual computing resources are not available.

At step S12.7, if enough resources to fulfill the order update is available, the configurator 1202 adds the requested addition to requester's 1102 custom environment.

Closing a Custom Environment

Figure 13:
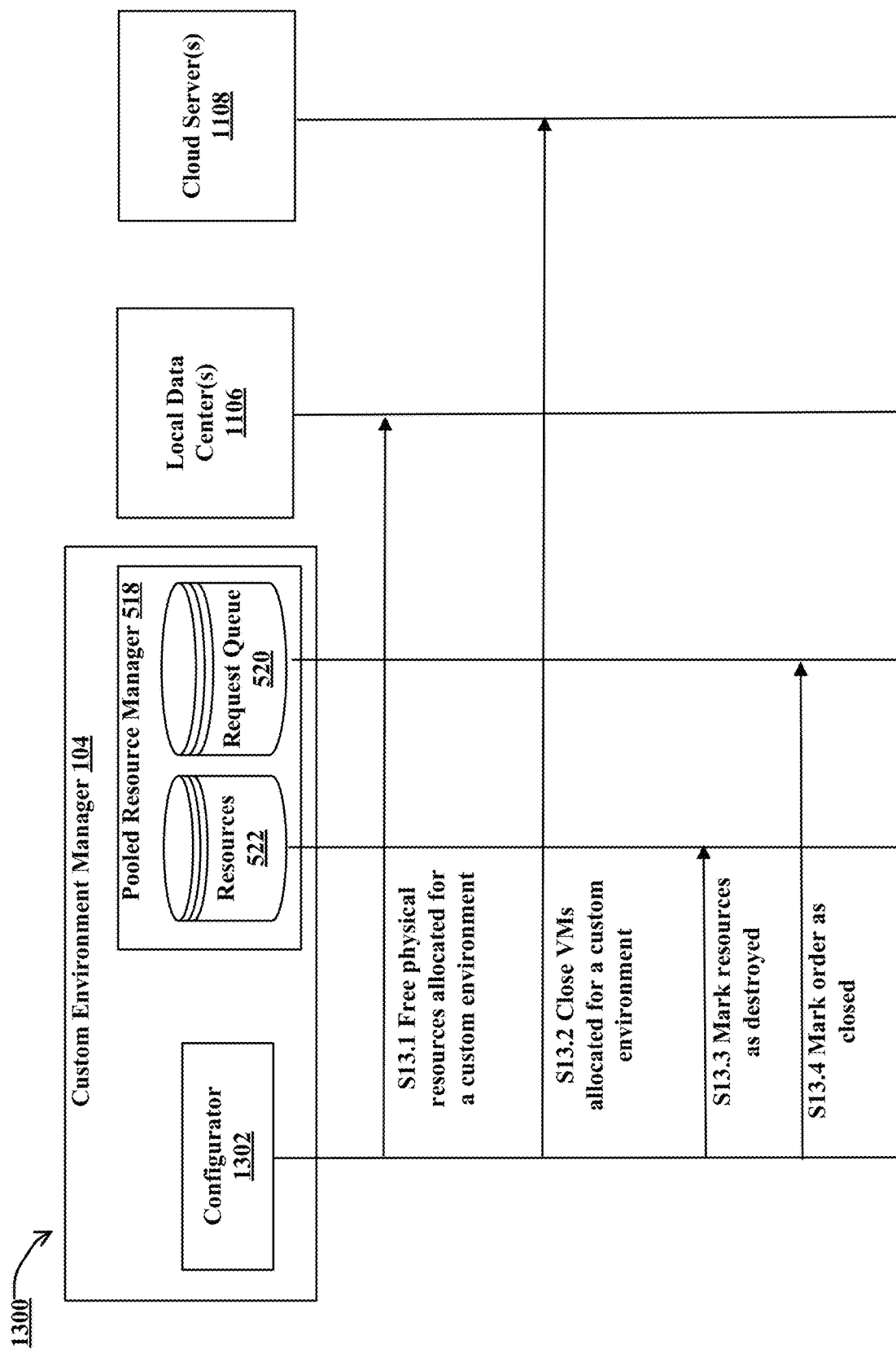
FIG. 13 is a sequence diagram illustrating a representative method of closing an order for a custom environment by the custom environment manager.

FIG. 13 is an example workflow 1300 illustrating a representative method of closing a custom environment by the custom environment manager 104. In some embodiments, the actions in the workflow may be performed in different orders and with different, fewer or additional actions than those illustrated in FIG. 13. Multiple actions can be combined in some implementations.

FIG. 13 includes workflow 1300 that begins at step S13.1 when a configurator 1302 frees physical resources in the local data centers 1106 held by the custom environment about to be closed. In one embodiment, physical resources can be recovered by rebooting the hardware, removing unwanted data and performing other operations such as ping and provisioning. In another embodiment, an Intelligent Platform Management Interface (IPMI) may be used to recover the physical computing resources.

Workflow 1300 continues at step S13.2 when the configurator 1302 frees virtual resources held by the custom environment by closing the virtual machines in one or more cloud servers 1108.

At step 13.3, the configurator 1302 marks the resources as destroyed in the resource database 522 located in the pooled resource manager 518 in the custom environment manager 104.

At step 13.4, the configurator 1302 marks the custom environment order as closed in request queue database 520 located in the pooled resource manager 518 in the custom environment manager 104.

Computer System

Figure 14:
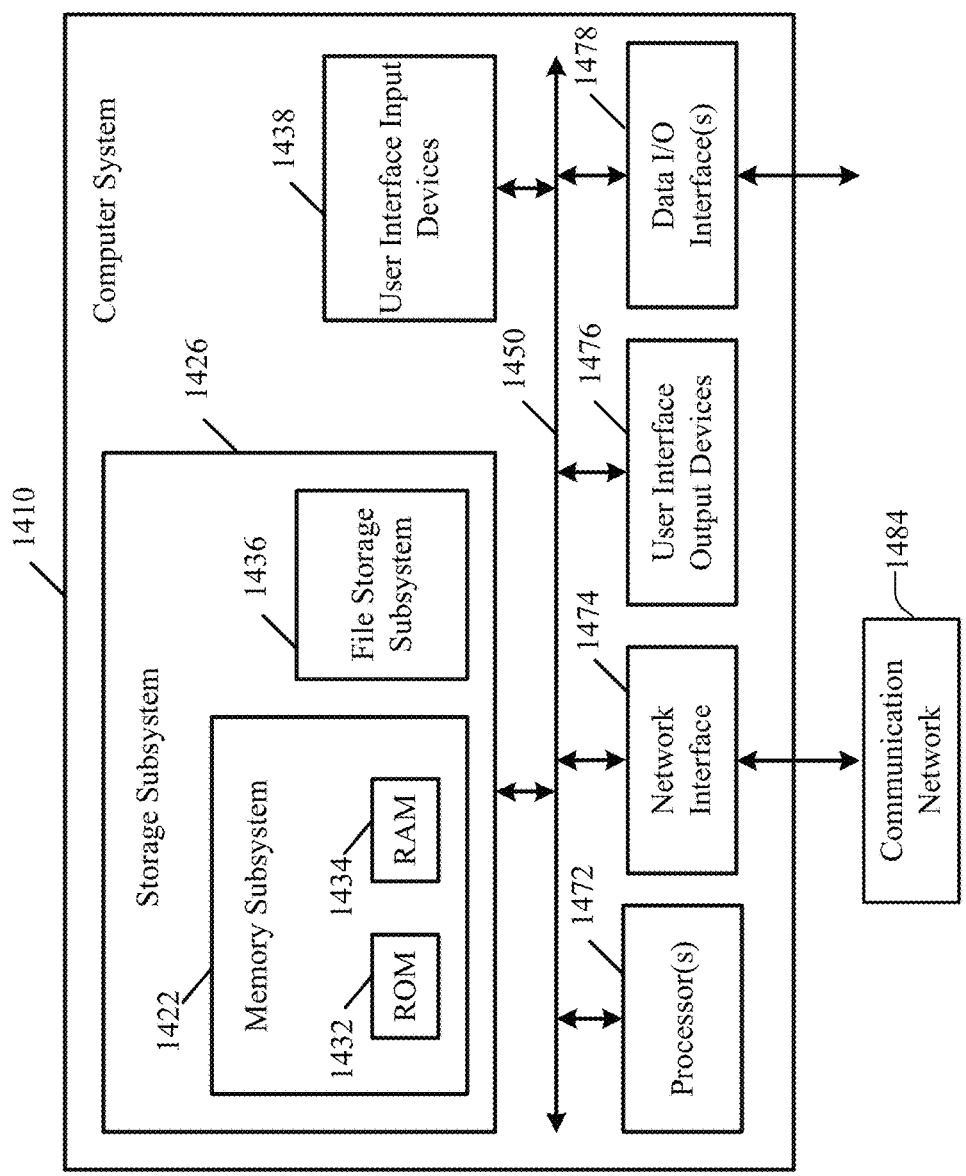
FIG. 14 is an example block diagram of a computing system that may incorporate embodiments of the present invention.

FIG. 14 is an example block diagram of a computing system that may incorporate embodiments of the present invention. System 1400 can be implemented using a computer program stored in system memory, or stored on other memory and distributed as an article of manufacture, separately from the computer system. Particularly it can be used to implement the custom environment manager 104 in various embodiments.

Computer system 1410 typically includes a processor subsystem 1472 which communicates with a number of peripheral devices via bus subsystem 1450. These peripheral devices may include a storage subsystem 1426, comprising a memory subsystem 1422 and a file storage subsystem 1436, user interface input devices 1438, user interface output devices 1478, and a network interface subsystem 1476. The input and output devices allow user interaction with computer system 1410 and network and channel emulators. Network interface subsystem 1474 provides an interface to outside networks and devices of the system 1400. The computer system further includes communication network 1484 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 1438 may include a keyboard, pointing devices such as a mouse, trackball, touchpad, or graphics tablet, a scanner, a touchscreen incorporated into the display, audio input devices such as voice recognition systems, microphones, and other types of input devices.

In general, use of the term "input device" is intended to include all possible types of devices and ways to input information into computer system 1410.

User interface output devices 1478 may include a display subsystem, a printer, a fax machine, or non-visual displays such as audio output devices. The display subsystem may include a flat panel device such as a liquid crystal display (LCD) or LED device, a projection device, a cathode ray tube (CRT) or some other mechanism for creating a visible image. The display subsystem may also provide a nonvisual display such as via audio output devices. In general, use of the term "output device" is intended to include all possible types of devices and ways to output information from computer system 1410 to the user or to another machine or computer system. The computer system further can include user interface output devices 1478 for communication with user equipment.

Storage subsystem 1426 stores the basic programming and data constructs that provide the functionality of certain embodiments of the present invention. For example, the various modules implementing the functionality of certain embodiments of the invention may be stored in a storage subsystem 1426. These software modules are generally executed by processor subsystem 1472.

Storage subsystem 1426 typically includes a number of memories including a main random access memory (RAM) 1434 for storage of instructions and data during program execution and a read-only memory (ROM) 1432 in which fixed instructions are stored. File storage subsystem 1436 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, and may be stored by file storage subsystem 1436. The host memory storage subsystem 1426 contains, among other things, computer instructions which, when executed by the processor subsystem 1472, cause the computer system to operate or perform functions as described herein. As used herein, processes and software that are said to run in or on "the host" or "the computer," execute on the processor subsystem 1472 in response to computer instructions and data in the host memory storage subsystem 1426 including any other local or remote storage for such instructions and data.

Bus subsystem 1450 provides a mechanism for letting the various components and subsystems of computer system 1410 communicate with each other as intended. Although bus subsystem 1450 is shown schematically as a single bus, alternative embodiments of the bus subsystem may use multiple busses.

Computer system 1410 itself can be of varying types including a personal computer, a portable computer, a workstation, a computer terminal, a network computer, a television, a mainframe, or any other data processing system or user device. Due to the ever changing nature of computers and networks, the description of computer system 1410 depicted in FIG. 14 is intended only as a specific example for purposes of illustrating embodiments of the present invention. Many other configurations of computer system 1410 are possible having more or less components than the computer system depicted in FIG. 14.

Some Particular Implementations

Some particular implementations and features are described in the following discussion.

One implementation of the disclosed technology includes a method for managing custom environments for testing and developing data management system. The disclosed method includes: (i) receiving orders from requestors including a first order requesting a custom environment or modification to a custom environment, the first order including a first prioritization that depends upon a quota for prioritized allocation of resources of a first requestor making the first order; (ii) storing the first order in a request queue that holds multiple orders having different prioritizations and made by different requestors; (iii) a computer system tracking available resources and unavailable resources in a resource pool comprising of virtual resources and physical resources deployed on machines external to the computer system; and (iv) a computer system creating custom environments based upon orders received by: (a) retrieving an order in the request queue, (b) checking whether the order retrieved has higher prioritization than other orders in the request queue and whether resources are available in the resource pool to meet the order, (c) and whenever the order has a higher prioritization than other orders in the request queue and there are sufficient resources available in the resource pool to fill the order, allocating available virtual resources and physical resources from the resource pool to create or customize the custom environment specified, and (d) at least commence returning the custom environment to the requestor of the order.

In some implementations, the method further includes a recipe database and further including retrieving specific virtual resources and physical resource configurations stored in the recipe database; and allocating virtual resources and physical resources according to the virtual resources and physical resources configurations retrieved from the recipe database.

In some implementations, the method further includes allocating virtual resources and physical resources includes creating one or more nodes of a virtual type in the virtual resources and a physical type in the physical resources and populating the one or more nodes created with data sources.

In some implementations, the method further includes virtual resources and physical resources includes locating one or more nodes of a virtual type available in the virtual resources in the resource pool and one or more nodes of a physical type available in the physical resources in the resource pool and populating the one or more nodes located with data sources.

In some implementations, the method further includes receiving an order for a custom environment wherein the order specifies a test scenario to be performed; and allocating specific ones of virtual resources and physical resources to meet requirements of the test scenario specified by the order.

In some implementations, the method further includes automatically recovering virtual resources and physical resources in a custom environment when tasks using the physical resources and the virtual resources ordered are complete, wherein the recovering includes closing nodes in virtual resources allocated and freeing physical resources allocated.

In some implementations, the method further includes allocating resources to subsequent orders from a second requestor at a lower prioritization than the first order by a first requester when quota for the second requestor is depleted.

In some implementations, the method further includes: (i) receiving from a second requestor a second order, the second order including a second prioritization that depends upon a quota of the second requestor making the second order, wherein the second prioritization of the second order is greater than the first prioritization of the first order; (ii) suspending processing of the first order; and (iii) allocating resources to the second order from the second requestor at a higher priority level than the first order until occurrence of either quota for the second requestor is depleted or the second order is completed.

In some implementations, the method further includes receiving an update communicating one or more changes to an order, including at least one of adding comments, extending time limit of the order, changing requesters of the order, closing the order, and adding ore removing physical resources and virtual resources to the order.

In some implementations, the method further includes creating a pre-bootstrapped custom environment image for immediate deployment and saving the pre-bootstrapped custom environment image for subsequent provisioning.

In some implementations, the method further includes retrieving a saved pre-bootstrapped custom environment image and creating one or more custom environments.

In some implementations, the method further includes a centralized collector to collect and store data across multiple custom environments, and present data collected by creating one or more dashboard displays to present data visualize collected in a centralized location.

In some implementations, the method further includes predicting future orders, anticipating requirements for the future orders predicted and preparing nodes in virtual resources and physical resources to be allocated to meet the requirements anticipated.

In some implementations, the method further includes testing functionality of a resource prior to allocating the resource to an order, and when a resource is determined to be inoperable, determining a replacement resource to be allocated to the order.

These methods and other implementations of the technology disclosed can include one or more of the following features and/or features described in connection with additional methods disclosed. In the interest of conciseness, the combinations of features disclosed in this application are not individually enumerated and are not repeated with each base set of features.

Another implementation may include a system, including one or more processors and memory coupled to the processors, containing computer instructions that, when executed on the processors, cause the system to manage custom environments for testing and developing data management system according to any of the methods described earlier.

Yet another implementation may include a non-transitory computer-readable storage media storing instructions to manage custom environments for testing and developing data management system, which instructions, when combined with computer hardware and executed, cause a computer to implement any of the methods described earlier. For purposes of this application, a computer-readable media does not include a transitory wave form.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A system for managing custom environments, including:
    one or more processors coupled with memory storing instructions that, when executed, perform actions implementing:
    one or more request receivers that receive orders from requestors including a first order requesting a custom environment or modification to a custom environment; the first order including a first prioritization that depends upon a quota for prioritized allocation of resources of a first requestor making the first order, and a specified test scenario to be performed; and store the first order in a request queue that holds multiple orders having different prioritizations and made by different requestors;
    one or more pooled resource managers that track available resources and unavailable resources in a resource pool comprising of virtual resources and physical resources deployed on machines external to the system;
    one or more configurators that create custom environments based upon multiple orders received by: retrieving an order in the request queue, checking whether the order retrieved has higher prioritization than other orders in the request queue and whether resources are available in the resource pool to meet the order, and whenever the order has a higher prioritization than other orders in the request queue and there are sufficient resources available in the resource pool to fill the order, allocating available virtual resources and physical resources from the resource pool to create or customize the custom environment specified in the order including allocating specific ones of virtual resources and physical resources to meet requirements of the specified test scenario; and at least commence returning the custom environment to the requestor of the order; and
    wherein the one or more pooled resource managers is configured to automatically recover virtual resources and physical resources in the custom environment when tasks using the physical resources and the virtual resources ordered are complete, wherein the recovering includes closing nodes in virtual resources allocated and freeing physical resources allocated.

2. The system of claim 1, further including a recipe database and further including retrieving specific virtual resources and physical resource configurations stored in the recipe database; and allocating virtual resources and physical resources according to the virtual resources and physical resources configurations retrieved from the recipe database.

3. The system of claim 1, wherein allocating virtual resources and physical resources includes creating one or more nodes of a virtual type in the virtual resources and a physical type in the physical resources and populating the one or more nodes created with data sources.

4. The system of claim 1, wherein allocating virtual resources and physical resources includes locating one or more nodes of a virtual type available in the virtual resources in the resource pool and one or more nodes of a physical type available in the physical resources in the resource pool and populating the one or more nodes located with data sources.

5. The system of claim 1, further including allocating resources to subsequent orders from a second requestor at a lower prioritization than the first order by a first requester when quota for the second requestor is depleted.

6. The system of claim 1, further including
    receiving from a second requestor a second order, the second order including a second prioritization that depends upon a quota of the second requestor making the second order, wherein the second prioritization of the second order is greater than the first prioritization of the first order;

suspending processing of the first order; and allocating resources to the second order from the second requestor at a higher priority level than the first order until occurrence of either quota for the second requestor is depleted or the second order is completed.

7. The system of claim 1, further including: receiving an update communicating one or more changes to an order, including at least one of adding comments, extending time limit of the order, changing requesters of the order, closing the order, and adding more physical resources and virtual resources to the order.

8. The system of claim 1, further including: creating a pre-bootstrapped custom environment image for immediate deployment and saving the pre-bootstrapped custom environment image for subsequent provisioning.

9. The system of claim 8, further including: retrieving a saved pre-bootstrapped custom environment image and creating one or more custom environments.

10. The system of claim 1, further including a centralized collector to collect and store data across multiple custom environments, and present data collected by creating one or more dashboard displays to present data visualize collected in a centralized location.

11. The system of claim 1, further including predicting future orders, anticipating requirements for the future orders predicted and preparing nodes in virtual resources and physical resources to be allocated to meet the requirements anticipated.

12. The system of claim 1, further including testing functionality of a resource prior to allocating the resource to an order, and when a resource is determined to be inoperable, determining a replacement resource to be allocated to the order.

13. A method for managing custom environments, including:

at a computer system, receiving orders from requestors including a first order requesting a custom environment or modification to a custom environment; the first order including a first prioritization that depends upon a quota for prioritized allocation of resources of a first requestor making the first order and a specified test scenario to be performed; and storing the first order in a request queue that holds multiple orders having different prioritizations and made by different requestors;

at the computer system, tracking available resources and unavailable resources in a resource pool comprising of virtual resources and physical resources deployed on machines external to the computer system;

at the computer system, creating custom environments based upon orders received by: retrieving an order in the request queue, checking whether the order retrieved has higher prioritization than other orders in the request queue and whether resources are available in the resource pool to meet the order, and whenever the order has a higher prioritization than other orders in the request queue and there are sufficient resources available in the resource pool to fill the order, allocating available virtual resources and physical resources from the resource pool to create or customize the custom environment specified, including allocating specific ones of virtual resources and physical resources to meet requirements of the specified test scenario, and at least commence returning the custom environment to the requestor of the order; and at the computer system, automatically recovering virtual resources and physical resources in the custom environment when tasks using the physical resources and the virtual resources ordered are complete, wherein the recovering includes closing nodes in virtual resources allocated and freeing physical resources allocated.

14. The method of claim 13, further including a recipe database and further including retrieving specific virtual resources and physical resource configurations stored in the recipe database; and allocating virtual resources and physical resources according to the virtual resources and physical resources configurations retrieved from the recipe database.

15. The method of claim 13, wherein allocating virtual resources and physical resources includes creating one or more nodes of a virtual type in the virtual resources and a physical type in the physical resources and populating the one or more nodes created with data sources.

16. The method of claim 13, wherein allocating virtual resources and physical resources includes locating one or more nodes of a virtual type available in the virtual resources in the resource pool and one or more nodes of a physical type available in the physical resources in the resource pool and populating the one or more nodes located with data sources.

17. The method of claim 13, further including allocating resources to subsequent orders from a second requestor at a lower prioritization than the first order by a first requester when quota for the second requestor is depleted.

18. The method of claim 13, further including receiving from a second requestor a second order, the second order including a second prioritization that depends upon a quota of the second requestor making the second order, wherein the second prioritization of the second order is greater than the first prioritization of the first order;

suspending processing of the first order; and allocating resources to the second order from the second requestor at a higher priority level than the first order until occurrence of either quota for the second requestor is depleted or the second order is completed.

19. The method of claim 13, further including: receiving an update communicating one or more changes to an order, including at least one of adding comments, extending time limit of the order, changing requesters of the order, closing the order, and adding more physical resources and virtual resources to the order.

20. The method of claim 13, further including: creating a pre-bootstrapped custom environment image for immediate deployment and saving the pre-bootstrapped custom environment image for subsequent provisioning.

21. The method of claim 20, further including: retrieving a saved pre-bootstrapped custom environment image and creating one or more custom environments.

22. The method of claim 13, further including a centralized collector to collect and store data across multiple custom environments, and present data collected by creating one or more dashboard displays to present data visualize collected in a centralized location.

23. The method of claim 13, further including predicting future orders, anticipating requirements for the future orders predicted and preparing nodes in virtual resources and physical resources to be allocated to meet the requirements anticipated.

24. The method of claim 13, further including testing functionality of a resource prior to allocating the resource to an order; and when a resource is determined to be inoperable, determining a replacement resource to be allocated to the order.

25. A non-transitory computer readable medium storing instructions for creating and managing custom environments, which instructions when executed by one or more processors implement:
    receiving from one or more requestors, orders requesting custom environments, wherein a requestor has a quota for prioritized allocation of resources to orders of the requestor; and wherein the orders include a first order requesting a custom environment or modification to a custom environment; the first order including a prioritization that depends upon a quota of a first requestor making the order and a specified test scenario to be performed;
    storing the first order in a request queue that holds multiple orders having different prioritizations and made by different requestors;
    tracking available resources and unavailable resources in a resource pool comprising of virtual resources and physical resources deployed on machines external to the non-transitory computer readable medium;
    creating custom environments based upon orders received by:
        retrieving an order in the request queue;
        checking whether the order retrieved has higher prioritization than other orders in the request queue and whether resources are available in the resource pool to meet the order;
        whenever the order has a higher prioritization than other orders in the request queue and there are sufficient resources available in the resource pool to fill the order, allocating available virtual resources and physical resources from the resource pool to create or customize the custom environment specified in the order including allocating specific ones of virtual resources and physical resources to meet requirements of the specified test scenario;
        at least commence returning the custom environment to the requestor of the order; and
        automatically recovering virtual resources and physical resources in the custom environment when tasks using the physical resources and the virtual resources ordered are complete, wherein the recovering includes closing nodes in virtual resources allocated and freeing physical resources allocated.

* * * * *

UNITED STATES PATENT AND TRADEMARK OFFICE
CERTIFICATE OF CORRECTION

| | |
|---|---|
| PATENT NO. | : 10,606,661 B2 |
| APPLICATION NO. | : 15/844253 |
| DATED | : March 31, 2020 |
| INVENTOR(S) | : Dao et al. |

It is certified that error appears in the above-identified patent and that said Letters Patent is hereby corrected as shown below:

In the Specification

In Column 8, Line 48, delete "112" and insert --114-- therefor

In Column 10, Line 49, delete "460." and insert --458.-- therefor

In Column 13, Line 63, delete "queuing" and insert --queueing-- therefor

In Column 16, Line 48, delete "1478," and insert --1476,-- therefor

In Column 16, Line 49, delete "1476." and insert --1474.-- therefor

In Column 17, Line 4, delete "1478" and insert --1476-- therefor

In Column 17, Line 16, delete "1478" and insert --1476-- therefor

In the Claims

In Column 20, Line 64, in Claim 6, after "including", insert --:--

In Column 22, Line 31, in Claim 18, after "including", insert --:--

In Column 23, Line 1, in Claim 24, delete "order;" and insert --order,-- therefor In Column 23, Line 14, in Claim 25, delete "order" and insert --order,-- therefor Signed and Sealed this
First Day of December, 2020

Andrei Iancu
*Director of the United States Patent and Trademark Office*